UNITED STATES PATENT OFFICE.

WILLIAM D. PATTEN, OF BROOKLYN, NEW YORK.

BAKING PREPARATION.

SPECIFICATION forming part of Letters Patent No. 674,140, dated May 14, 1901.

Application filed October 2, 1900. Serial No. 31,741. (No specimens.)

*To all whom it may concern:*

Be it known that I, WILLIAM D. PATTEN, a citizen of the United States, and a resident of Brooklyn, in the county of Kings and State of New York, have invented certain new and useful Improvements in Baking Preparations, of which the following is a specification.

This invention relates to a new and improved baking preparation.

The chief object of the invention is to provide a baking preparation of superior quality at comparatively low cost and which in some of its forms will have the quality of retaining its strength against deterioration due to moisture. The invention may take the form of a baking-powder, in which form the keeping quality is of special importance, or it may take the form of prepared flour—that is, so-called "self-raising" flour—in which form the keeping quality of the leavening agent is also of importance. The invention may also take the form of dough ready for baking and containing the elements of my new leavening agent, in which form the keeping quality of the leavening agent will not be as important as its efficiency and low cost.

My invention is attained through the discovery that acid-pyro-phosphate of soda or the product obtained by roasting an acid-ortho-phosphate of soda in a prescribed manner is of special utility as the acid element of a leavening agent for baking purposes. I have discovered that by subjecting the acid-ortho-phosphate of soda ($H_2NaPO_4$) to a degree of heat sufficient to remove part of the chemical water, as shown by this formula, I produce an acid salt of great utility in baking-powder manufacture and other baking preparations, such as prepared flour and dough ready for baking, and one which has never been heretofore utilized in a baking preparation. This acid salt in its best form corresponds with the formula $H_2Na_2P_2O_7$ and the reaction by which this form of the salt is produced corresponds with the formula $2H_2NaPO_4 - H_2O = H_2Na_2P_2O_7$. I find that the properties of this salt are substantially different from the acid-ortho-phosphate of soda and that it is, in fact, a distinctly different chemical body. This salt treated in the usual manner (cold test) for acid strength shows a test of about fifty per cent. (50%) in terms of bicarbonate of soda, indicating a reaction with bicarbonate of soda substantially represented by the formula

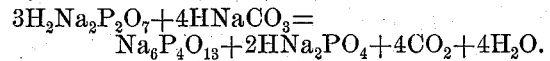

$$3H_2Na_2P_2O_7 + 4HNaCO_3 = Na_6P_4O_{13} + 2HNa_2PO_4 + 4CO_2 + 4H_2O.$$

In the case of anhydrous acid-ortho-phosphate of soda, however, the test shows a reaction, which is substantially represented by the formula $$H_2NaPO_4 + HNaCO_3 = HNa_2PO_4 + CO_2 + H_2O.$$

I find this body—viz., acid-pyro-phosphate of soda ($H_2Na_2P_2O_7$) to be in every substantial respect the equivalent of cream of tartar for baking purposes and that it can be produced at less than half the cost of cream of tartar. It is a mild acid salt, working substantially with the same rapidity in the baking process as does cream of tartar, and it is anhydrous and non-hygroscopic and therefore effective as regards the keeping qualities of the baking preparation in which it is used. It will be seen that in the above reaction—viz.,

$$2H_2NaPO_4 - H_2O = H_2Na_2P_2O_7$$

one molecule of water is eliminated from two molecules of acid-ortho-phosphate of soda, thereby producing the desired salt in the form of the acid-pyro-phosphate of soda. My invention, however, is not limited to the employment only of acid-pyro-phosphate of soda corresponding to the formula $H_2Na_2P_2O_7$, since the substantial benefits, more or less, of the invention may be obtained by the employment of acid salts containing proportions of chemical water somewhat in excess of the chemical water contained in the acid-pyro-phosphate of soda, but substantially less than is contained in the acid-ortho-phosphate of soda. Acid-ortho-phosphate of soda is entirely unsuited for use as the acid element of a baking-powder, because it is intensely hygroscopic. The acid salt, however, whose employment is within the scope of my invention, must be substantially non-hygroscopic—that is to say, sufficiently non-hygroscopic to make it practically available for my purpose. The formula

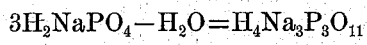

$$3H_2NaPO_4 - H_2O = H_4Na_3P_3O_{11}$$

represents an example of the acid salts such as those to which I refer as being within the scope of my invention. On the other hand, acid salts whose use is within the scope of my invention may contain somewhat less chemical water than is present in acid-pyro-phosphate of soda, ($H_2Na_2P_2O_7$.) It is essential, however, that a substantial amount of chemical water be present in the acid salt in order that it may have a practicable acid strength, for if all the chemical water be removed the resulting salt would take the form of a meta-phosphate of soda corresponding to the formula $NaPO_3$, which is a substantially non-acid salt and therefore useless in a baking preparation. The formula

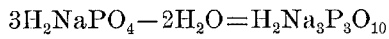
$$3H_2NaPO_4 - 2H_2O = H_2Na_3P_3O_{10}$$

represents an example of the acid salts such as those to which I refer as being within the scope of my invention. These acid salts are also non-hygroscopic, or substantially so. The range of acid elements which I may employ in my baking preparation may be expressed by the formula $$X(H_2NaPO_4) - Y(H_2O)$$

in which Y=1 and X=1+, it being understood, however, that the relative values of X and Y must be such that the acid element will possess substantial acid strength and be substantially non-hygroscopic—i. e., sufficiently non-hygroscopic to be practicable.

In the preparation of the acid salt I first produce the ordinary acid-ortho-phosphate of soda by any suitable means, such as treating neutral ortho-phosphate of soda with phosphoric acid. I then subject this substance to a roasting process, removing the water of crystallization and raising the applied heat 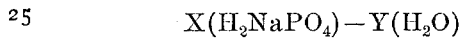 to a sufficient temperature to effect the decomposition of the acid-ortho-phosphate of soda and the elimination of a substantial amount of its chemical water, as described. I find in practice that the best results are obtained within a range of temperature of from 375° to 425° Fahrenheit, although I do not by any means limit myself to these temperatures. An imperfect change seems to be effected at a much lower temperature, and such treatment would therefore, at least in part, secure the advantages of my invention. A temperature of 350° Fahrenheit has been used with substantial success. A much higher temperature than described may be used without a substantial change in the effective characteristics of the substance. If, however, it be heated to a red heat, an insoluble meta-phosphate of soda seems to be formed, corresponding with the formula $NaPO_3$, which, being substantially non-acid in its character, is of no utility for baking purposes. At temperatures between 425° Fahrenheit and a red heat a substance or, perhaps, different substances are produced, the exact character of which depends upon the degree of heat applied, but which as far as baking purposes are concerned are equivalent to a mixture of acid-pyro-phosphate of soda ($H_2Na_2P_2O_7$) and the insoluble substantially non-acid meta-phosphate, ($NaPO_3$.) The use of such substances for baking purposes would therefore in part secure the advantages of my invention even though overheating had in part impaired their acid power. The practical maximum limit of temperature is reached when the acid power of the substance produced is so greatly impaired as not to be a practicable substance for baking purposes.

What I claim as new, and desire to secure by Letters Patent, is—

1. A baking-powder or baking preparation comprising in its composition a carbonate of an alkali, and an acid phosphate of soda of substantial acid strength and substantially non-hygroscopic and corresponding to the formula $X(H_2NaPO_4) - Y(H_2O,)$ said acid phosphate of soda having substantially the material qualities of the product resulting from subjecting acid-ortho-phosphate of soda to a suitable temperature substantially between 350° Fahrenheit and red heat, substantially as and for the purposes set forth.

2. A baking-powder or baking preparation comprising in its composition a carbonate of an alkali, and acid-pyro-phosphate of soda substantially corresponding to the formula $H_2Na_2P_2O_7$, said body being substantially non-hygroscopic, substantially as and for the purposes set forth.

3. A baking-powder or baking preparation comprising in its composition a carbonate of an alkali, and an acid phosphate of soda of substantial acid strength and substantially non-hygroscopic, said acid phosphate of soda being the product resulting from subjecting acid-ortho-phosphate of soda to a suitable temperature substantially between 350° Fahrenheit and red heat and corresponding to the formula $X(H_2NaPO_4) - Y(H_2O)$ substantially as and for the purpose set forth.

4. A baking-powder or baking preparation comprising in its composition a carbonate of an alkali, and an acid phosphate of soda of substantial acid strength and substantially non-hygroscopic, said acid phosphate of soda being the product resulting from subjecting acid-ortho-phosphate of soda to a suitable temperature substantially between 375° Fahrenheit and 425° Fahrenheit and corresponding to the formula $X(H_2NaPO_4) - Y(H_2O)$ substantially as and for the purpose set forth.

In testimony whereof I have signed my name to this specification in the presence of two subscribing witnesses.

WILLIAM D. PATTEN.

Witnesses:
NICHOLAS M. GOODLETT, Jr.,
EDWIN SEGER.